(12) United States Patent
Ono

(10) Patent No.: US 11,174,945 B2
(45) Date of Patent: Nov. 16, 2021

(54) GASKET

(71) Applicant: NOK CORPORATION, Tokyo (JP)

(72) Inventor: Tasuku Ono, Kumamoto (JP)

(73) Assignee: NOK CORPORATION, Tokyo (JP)

( * ) Notice: Subject to any disclaimer, the term of this patent is extended or adjusted under 35 U.S.C. 154(b) by 116 days.

(21) Appl. No.: 16/434,265

(22) Filed: Jun. 7, 2019

(65) Prior Publication Data

US 2020/0018398 A1 Jan. 16, 2020

(30) Foreign Application Priority Data

Jul. 10, 2018 (JP) .............................. JP2018-130969

(51) Int. Cl.
| | |
|---|---|
| *F16J 15/34* | (2006.01) |
| *F16J 15/06* | (2006.01) |
| *F16J 15/10* | (2006.01) |
| *F16J 15/3268* | (2016.01) |
| *F16J 15/50* | (2006.01) |

(52) U.S. Cl.
CPC ......... *F16J 15/3416* (2013.01); *F16J 15/061* (2013.01); *F16J 15/106* (2013.01); *F16J 15/3268* (2013.01); *F16J 15/50* (2013.01)

(58) Field of Classification Search
CPC .. F16J 15/3416; F16J 15/3412; F16J 15/3424; F16J 15/06; F16J 15/061; F16J 15/0831; F16J 15/062; F16J 15/10; F16J 15/102; F16J 15/104; F16J 15/106; F16J 15/2368; F16J 15/50
USPC ...................................................... 277/598
See application file for complete search history.

(56) References Cited

U.S. PATENT DOCUMENTS

| | | | | |
|---|---|---|---|---|
| 2,600,714 A | * | 6/1952 | Max ..................... | A47J 27/0806 220/298 |
| 6,779,802 B2 | * | 8/2004 | Westra ..................... | A47L 9/00 277/628 |
| 6,981,704 B2 | * | 1/2006 | Okazaki ................. | F16J 15/061 277/638 |
| 8,739,690 B2 | * | 6/2014 | Chameroy ............. | F16J 15/025 99/337 |

(Continued)

FOREIGN PATENT DOCUMENTS

| | | |
|---|---|---|
| GN | 205136592 U | 4/2016 |
| JP | 10-9395 | 1/1998 |
| WO | 2014/185168 A1 | 11/2014 |

OTHER PUBLICATIONS

China Official Action issued in CN Application No. 201910480228 dated Sep. 23, 2020.

(Continued)

*Primary Examiner* — Nathan Cumar
(74) *Attorney, Agent, or Firm* — Greenblum & Bernstein, P.L.C.

(57) ABSTRACT

A gasket improves sealing performance. A gasket to be placed in an annular groove includes an annular base to be placed in the groove, and a plurality of protrusions arranged at intervals on the base in a circumferential direction of the base. The protrusions protrude from the base to face side surfaces of the groove and have support surfaces with curvatures corresponding to curvatures of the side surfaces of the groove. Each protrusion has a length in the circumferential direction greater than an interval between facing ends of adjacent ones of the protrusions in the circumferential direction.

20 Claims, 8 Drawing Sheets

(56) References Cited

U.S. PATENT DOCUMENTS

2003/0030232 A1* 2/2003 Westra ..................... A47L 9/00
  277/628
2008/0265523 A1* 10/2008 Galpin ................... F16J 15/061
  277/590
2010/0044970 A1 2/2010 Suzuki et al.

OTHER PUBLICATIONS

European Search Report, European Patent Office, Application No. 19180759.3, dated Nov. 13, 2019, 7 pages.
European Official Action issued in Application No. 19 180 759.3, dated Dec. 3, 2020.

* cited by examiner

// GASKET

CROSS-REFERENCE TO RELATED APPLICATIONS

This application claims the benefit of priority to Japanese Patent Application No. 2018-130969, filed on Jul. 10, 2018, the entire contents of which are hereby incorporated by reference.

BACKGROUND

1. Technical Field

The present invention relates to a gasket.

2. Description of the Background

A housing for a coolant tank, an inlet manifold, or a filter bracket in, for example, an automobile is sealed with an annular gasket (e.g., Japanese Unexamined Patent Application Publication No. 10-9395, hereafter Patent Literature 1).

BRIEF SUMMARY

A gasket described in Patent Literature 1 is placed in an annular groove in a housing. To prevent the gasket from being misaligned inside the groove, the gasket has protrusions that face the side surfaces of the groove. In a plan view of the gasket, the protrusions have middle portions in the circumferential direction curved toward the side surfaces of the groove. The gasket thus has a smaller area of contact with the side surfaces of the groove. This gasket is to be designed to improve sealing performance.

One or more aspects of the present invention are directed to improving the sealing performance of a gasket.

An aspect of the present invention provides a gasket to be placed in an annular groove, the gasket including:

an annular base to be placed in the groove; and a plurality of protrusions arranged at intervals on the base in a circumferential direction of the base, the plurality of protrusions protruding from the base to face side surfaces of the groove and having support surfaces with curvatures corresponding to curvatures of the side surfaces of the groove, wherein each protrusion has a length in the circumferential direction greater than an interval between facing ends of adjacent ones of the protrusions in the circumferential direction.

The gasket according to the above aspect of the present invention improves sealing performance.

DETAILED DESCRIPTION

A gasket according to an embodiment will now be described with reference to the drawings. The present invention should not be limited to the embodiment. The components in the embodiment include components that are replaceable or easily conceivable by those skilled in the art or components substantially the same as those described in the embodiment.

Figure 1:
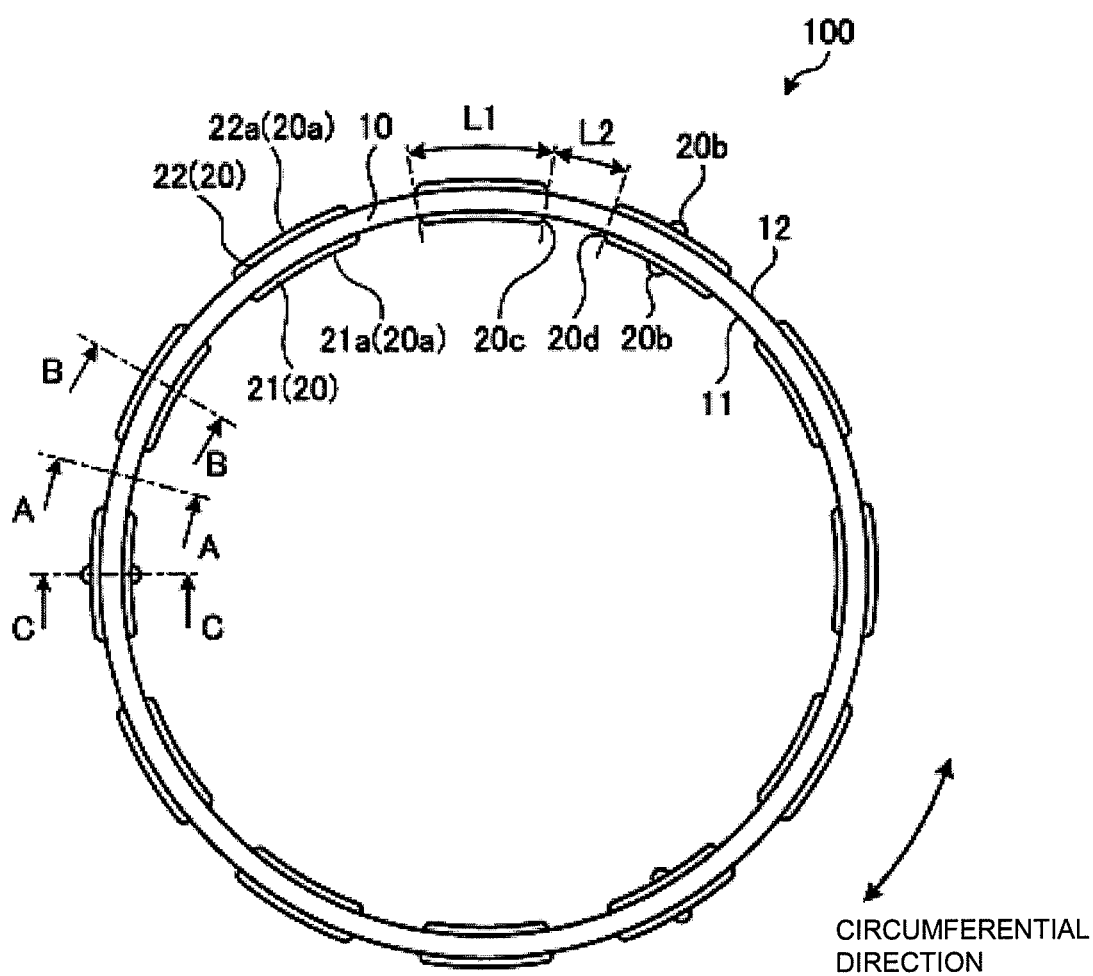
FIG. 1 is a plan view of a gasket according to an embodiment.
Figure 2:
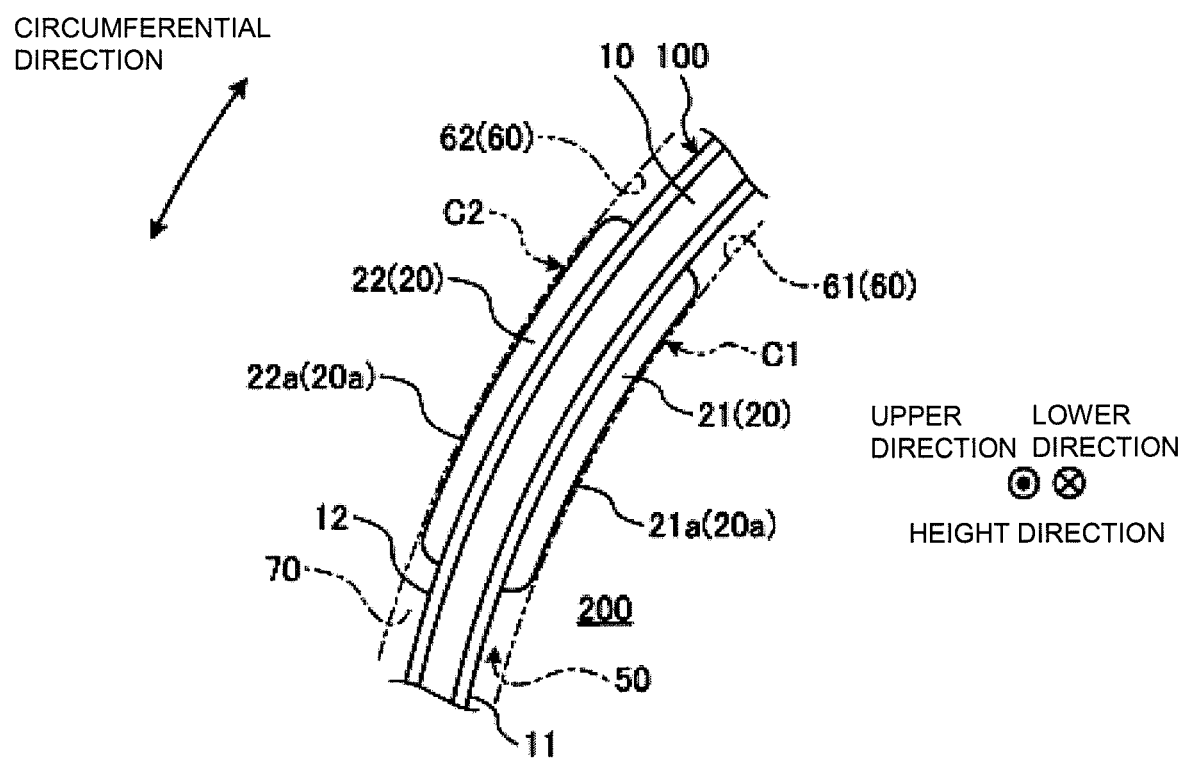
FIG. 2 is an enlarged partial view of FIG. 1.

FIG. 1 is a plan view of a gasket 100 according to the embodiment. FIG. 2 is an enlarged partial view of FIG. 1. As shown in FIG. 1, the gasket 100 is annular, and is formed from a rubber material such as silicone rubber or fluorine rubber. The gasket 100 is elastically deformable upon receiving an external force. For example, the gasket 100 has a rubber hardness of 60 Shore A (HDA 60) or less (in accordance with JIS K 7215 measured with a Shore A durometer).

The gasket 100 is placed in an annular groove 50 in a housing (predetermined member) 200 for a coolant tank, an inlet manifold, or a filter bracket in, for example, an automobile. The housing 200 is formed from, for example, a resin material, or may be formed from other materials such as metal. The groove 50 has side surfaces 60 and a bottom surface 70 (refer to, for example, FIG. 2). The side surfaces 60 include an inner side surface 61 along the inner circumference of the gasket 100 and an outer side surface 62 along the outer circumference of the gasket 100. The bottom surface 70 is flat for receiving the gasket 100.

The gasket 100 has a base 10 and protrusions 20. The base 10 is annular in correspondence with the shape of the groove 50 in the housing 200. For example, the groove 50 is an annular ring in the present embodiment. The gasket 100 is thus an annular ring in correspondence with the shape of the groove 50. The groove 50 and the gasket 100 may be of a shape other than an annular ring.

In describing the structure of the gasket 100 below, the direction in which the base 10 extends annularly is referred to as the circumferential direction of the base 10. For the gasket 100 placed in the groove 50, the direction perpendicular to the bottom surface 70 of the groove 50 is referred to as the height direction of the base 10. For the height of the base 10, the direction from the gasket 100 toward the bottom surface 70 of the groove 50 is referred to as a lower direction, and the direction opposite to the lower direction is referred to as an upper direction.

The protrusions 20 protrude toward the side surfaces 60 of the groove 50. The protrusions 20 are arranged along the entire circumference of the base 10 at intervals in the circumferential direction. Although the protrusions 20 are arranged with, for example, regular pitches in the circumferential direction of the base 10, the protrusions 20 may be arranged with other pitches. For example, at least one pair of adjacent protrusions 20 may be arranged with a pitch different from the pitches between other protrusions.

The protrusions 20 have support surfaces 20a facing the side surfaces 60. As shown in FIG. 2, the support surfaces 20a have circumferential curvatures corresponding to the curvatures of the side surfaces 60. For example, the support surfaces 20a are parallel to the side surfaces 60 in the present embodiment. The support surfaces 20a each have two round ends in the circumferential direction.

Some of the protrusions 20 further have small protrusions 20b. In the present embodiment, every fourth protrusion 20 in the circumferential direction has a small protrusion 20b, but the arrangement is not limited to this. Each protrusion 20 may have a small protrusion 20b. For example, each small protrusion 20b is hemispherical and protrudes from the support surface 20a toward the side surface 60, but may be of a different shape. Each small protrusion 20b is located, for example, in the circumferential middle of the protrusion 20. One support surface 20a may have a plurality of small protrusions 20b.

Each protrusion 20 has a length L1 in the circumferential direction. The protrusions 20 are adjacent circumferentially at an interval L2 between their facing ends (an end 20c and an end 20d in FIG. 1). The length L1 is greater than the interval L2. In the gasket 100 placed in the groove 50, a portion in contact with the side surfaces 60 with the protrusions 20 has a greater length than a portion that is not in contact with the side surfaces 60 in the circumferential direction.

Each protrusion 20 includes an inner circumferential protrusion 21 and an outer circumferential protrusion 22. The inner circumferential protrusions 21 are located on the inner circumference of the base 10. The inner circumferential protrusions 21 protrude from the inner circumferential surface 11 of the base 10 toward the inner side surface 61 of the groove 50. The inner circumferential protrusions 21 have inner circumferential support surfaces 21a facing the inner side surface 61. The inner circumferential support surfaces 21a have a curvature corresponding to the curvature of the inner side surface 61. In the present embodiment, the inner circumferential support surfaces 21a have the same curvature C1 as the inner side surface 61.

The outer circumferential protrusions 22 are located on the outer circumference of the base 10. The outer circumferential protrusions 22 protrude from the outer circumferential surface 12 of the base 10 toward the outer side surface 62 of the groove 50. The outer circumferential protrusions 22 have outer circumferential support surfaces 22a facing the outer side surface 62. The outer circumferential support surfaces 22a have a curvature corresponding to the curvature of the outer side surface 62. In the present embodiment, the outer circumferential support surfaces 22a have the same curvature C2 as the outer side surface 62.

In the present embodiment, the inner side surface 61 and the outer side surface 62 each have a cylindrical profile. The inner circumferential support surfaces 21a have the same curvature C1 as the inner side surface 61, as defined by, for example, parts of a cylindrical surface having the same diameter as the inner side surface 61. In the same manner, the outer circumferential support surfaces 22a have the same curvature C2 as the outer side surface 62, as defined by, for example, parts of a cylindrical surface having the same diameter as the outer side surface 62.

In the present embodiment, the inner circumferential protrusions 21 are arranged in the same ranges as the corresponding outer circumferential protrusions 22 in the circumferential direction. The inner circumferential protrusions 21 have the same length (length L1 each) as the corresponding outer circumferential protrusions 22 in the circumferential direction.

Figure 3:
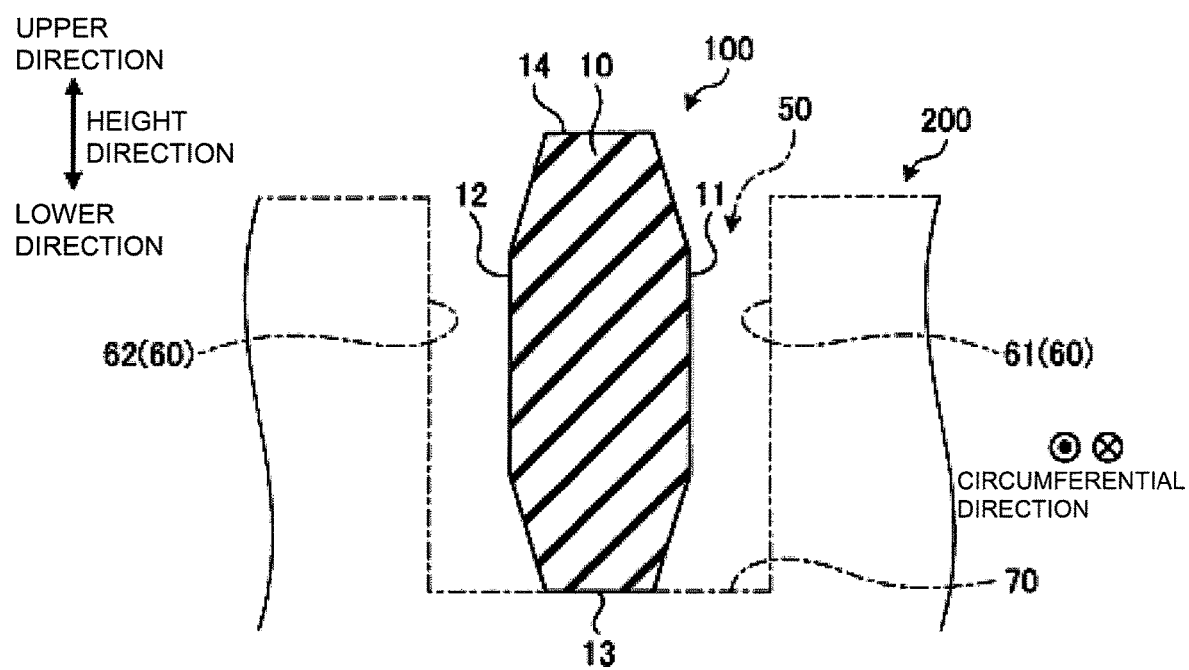
FIG. 3 is a cross-sectional view taken along line A-A in FIG. 1.

FIG. 3 is a cross-sectional view taken along line A-A in FIG. 1. As shown in FIG. 3, the base 10 is octagonal as viewed in a cross section along a plane perpendicular to the circumferential direction. The inner circumferential surface 11 and the outer circumferential surface 12 are parallel to each other. The base 10 has a lower surface 13 and an upper surface 14. The lower surface 13 is in contact with the bottom surface 70 of the groove 50. The upper surface 14 comes in contact with a sealing member 300 for sealing the housing 200 (refer to, for example, FIGS. 6 and 7). The lower surface 13 and the upper surface 14 are parallel to each other.

Figure 4:
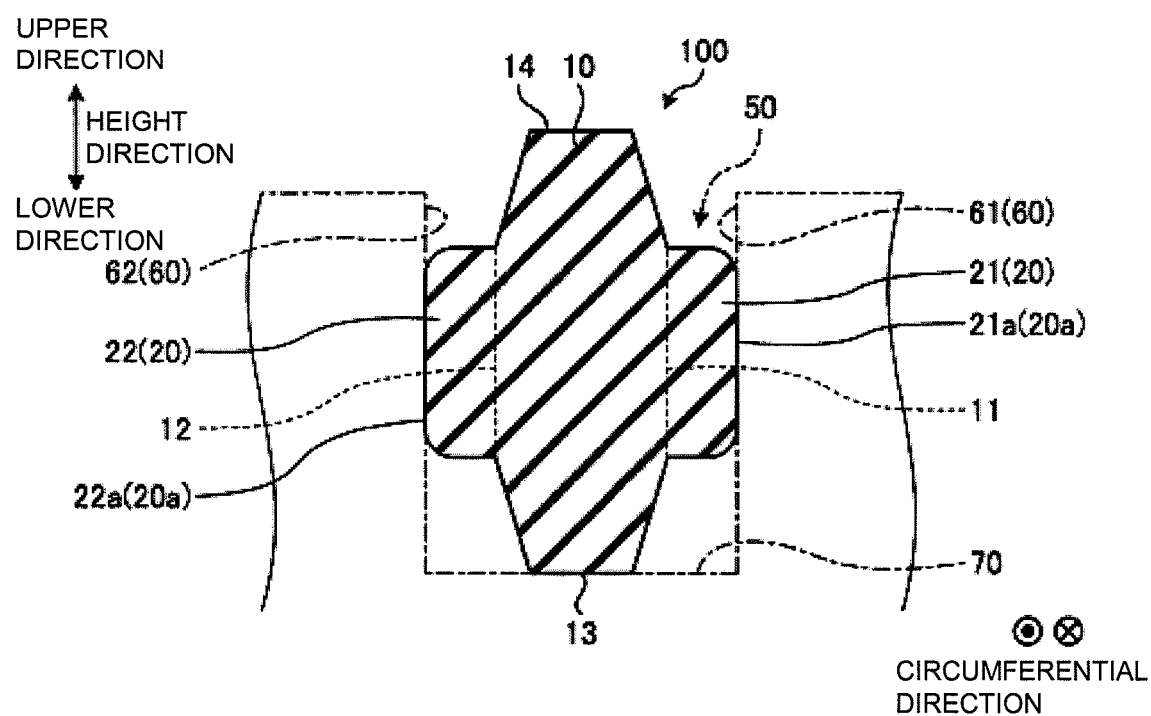
FIG. 4 is a cross-sectional view taken along line B-B in FIG. 1.

FIG. 4 is a cross-sectional view taken along line B-B in FIG. 1. FIG. 4 shows a portion of the base 10 having the protrusions 20. As shown in FIG. 4, the support surfaces 20a (the inner circumferential support surface 21a and the outer circumferential support surface 22a) each have a round upper end and a round lower end in the height direction.

Figure 5:
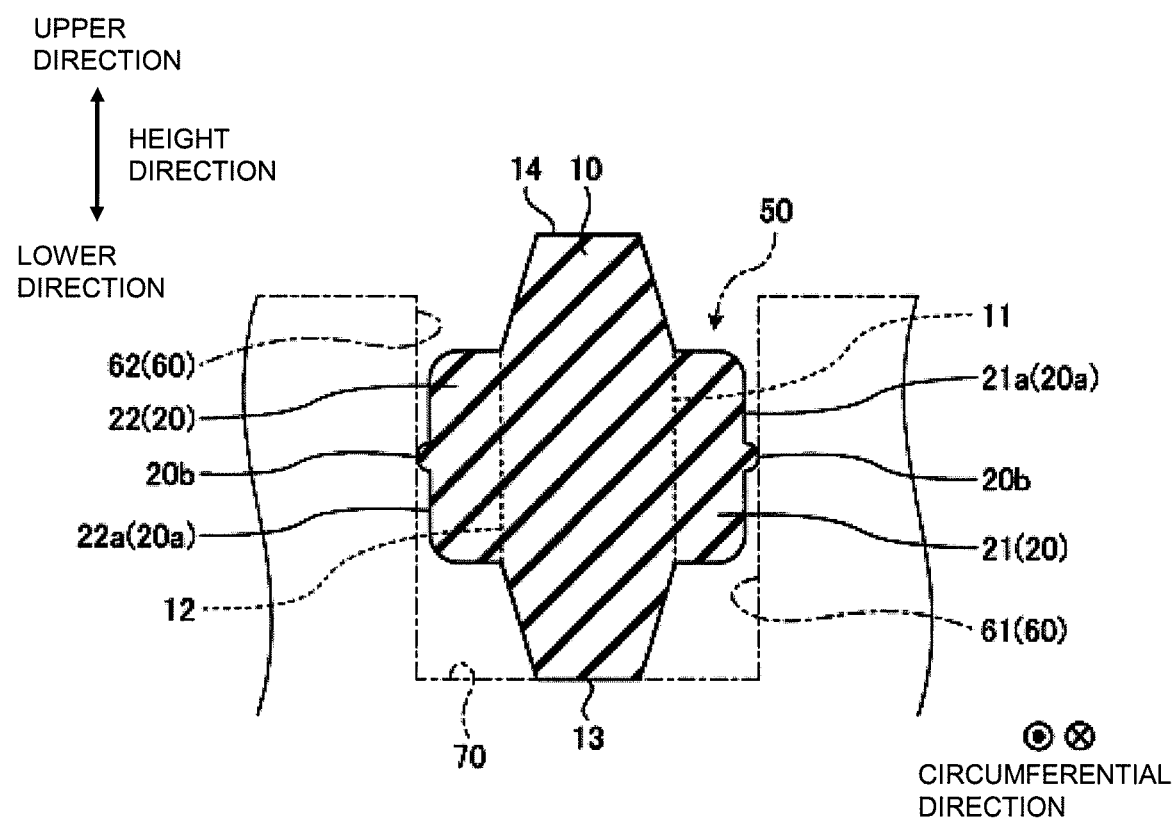
FIG. 5 is a cross-sectional view taken along line C-C in FIG. 1.

FIG. 5 is a cross-sectional view taken along line C-C in FIG. 1. FIG. 5 is a cross-sectional view including the protrusions 20 with the small protrusions 20b. As shown in FIG. 5, the small protrusions 20b are located, for example, in the middle of the support surfaces 20a in the height direction. However, the small protrusions 20b may be located in different places. Each support surface 20a may have a plurality of small protrusions 20b arranged in the height direction.

Figure 6:
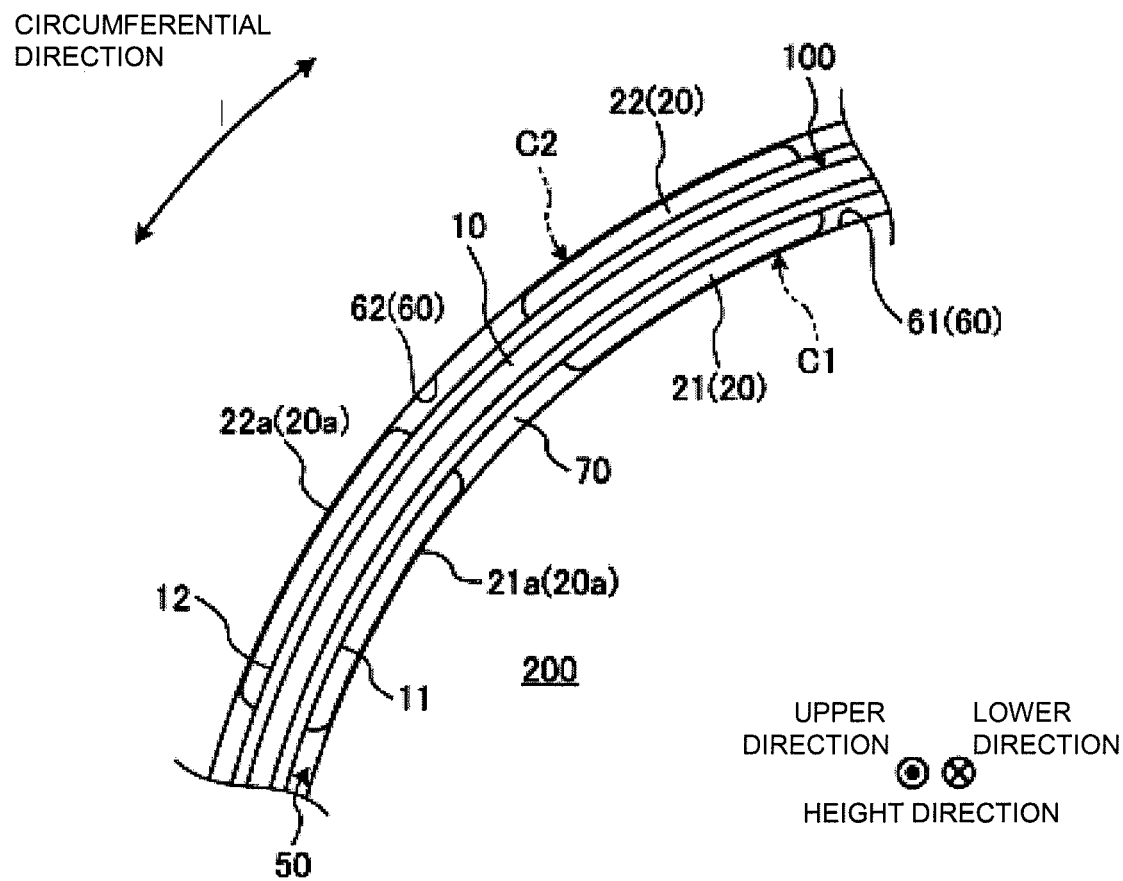
FIG. 6 is a plan view of the gasket placed in a groove.
Figure 7:
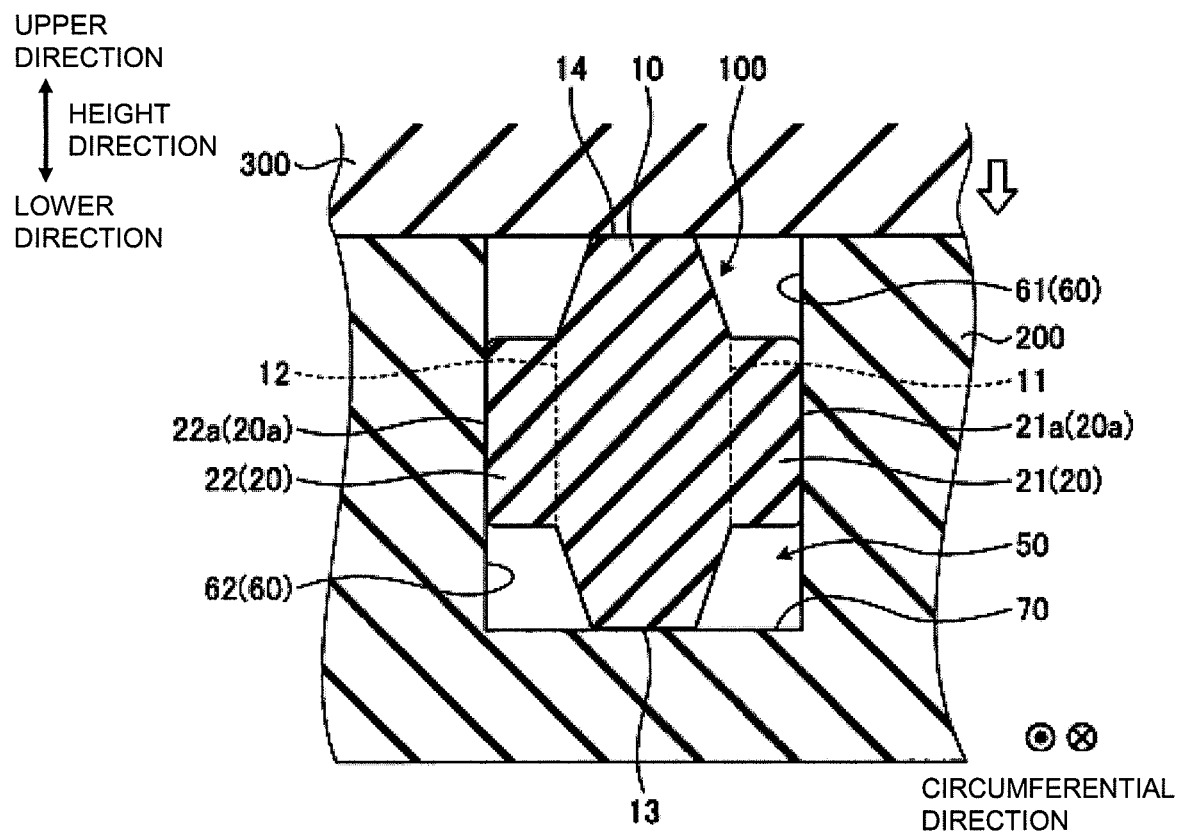
FIG. 7 is a cross-sectional view of the gasket placed in the groove and sealed.

FIG. 6 is a plan view of the gasket 100 placed in the groove 50. FIG. 7 is a cross-sectional view of the gasket placed in the groove and sealed. The gasket 100 elastically deforms within the groove 50 when the gasket 100 is placed in the groove 50 and the housing 200 is sealed with the sealing member 300. In the present embodiment, the support surfaces 20a have the curvatures C1 and C2 corresponding to the curvatures of the side surfaces 60. The gasket 100 placed in the groove 50 thus has substantially the entire support surfaces 20a in contact with the side surfaces 60. Thus, as shown in FIGS. 6 and 7, the gasket 100 sealed by the sealing member 300 has the support surfaces 20a stably supported by the side surfaces 60, and is less likely to be misaligned inside the groove 50. The support surfaces 20a having substantially the entire surfaces in contact with the side surfaces 60 generate a greater frictional force between the support surfaces 20a and the side surfaces 60. This reduces the likelihood that the gasket 100 slips from the groove 50.

In the present embodiment, the support surfaces 20a (the inner circumferential support surface 21a and the outer circumferential support surface 22a) each have a round upper end and a round lower end in the height direction. The support surfaces 20a each have two round ends in the circumferential direction. The spaces left between the round portions and the side surfaces 60 allow the protrusions 20 to deform sufficiently and achieve stable sealing.

The length L1 of each protrusion 20 in the circumferential direction is greater than the interval L2 between the facing ends of protrusions 20 adjacent in the circumferential direction. In the gasket 100 placed in the groove 50 and sealed, a portion in contact with the side surfaces 60 with the support surfaces 20a has a greater length than a portion that is not in contact with the side surfaces 60 in the circumferential direction. The gasket 100 fills a larger space in the groove 50 and improves sealing performance.

Figure 8:
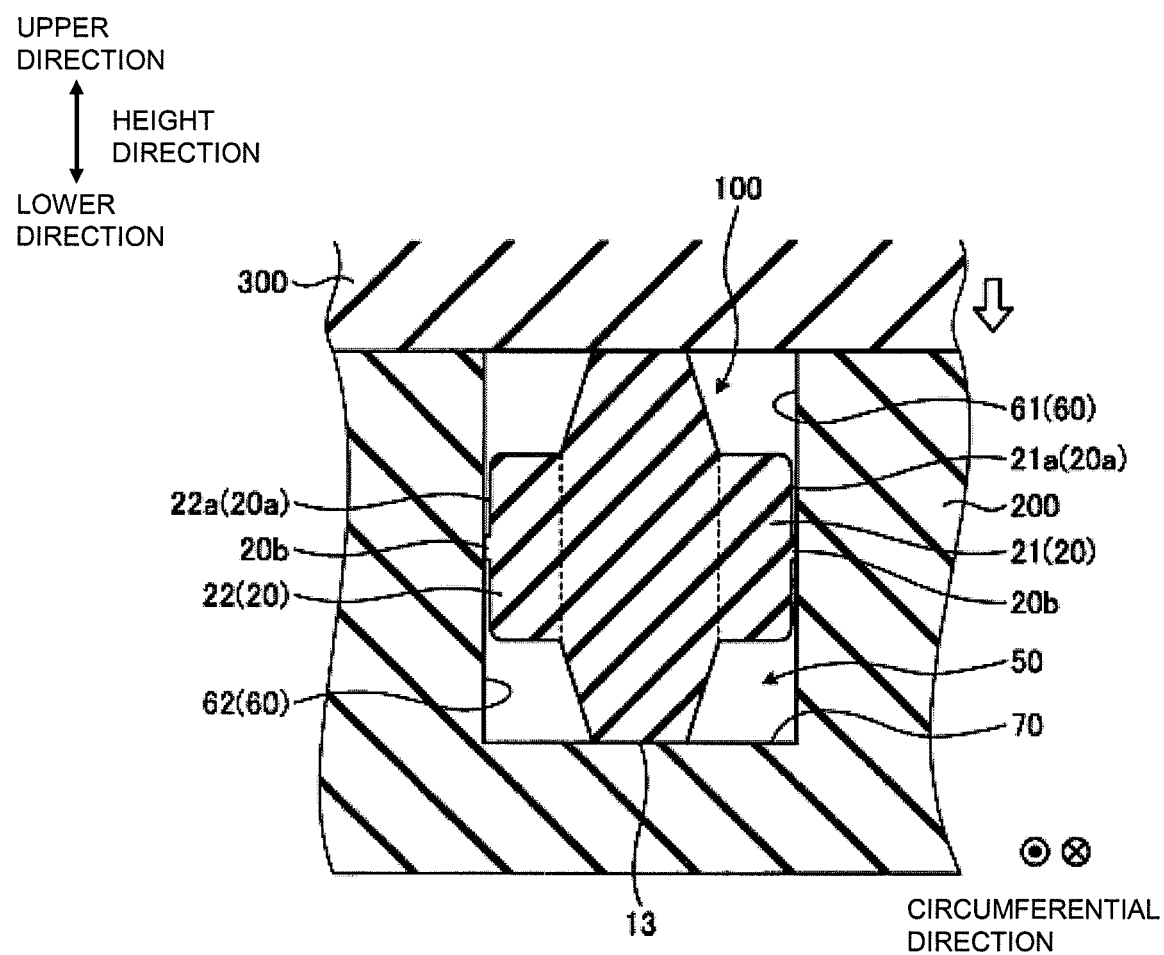
FIG. 8 is a cross-sectional view of the gasket placed in the groove and sealed.

FIG. 8 is a cross-sectional view of the gasket placed in the groove and sealed. FIG. 8 is a cross-sectional view including the portion with the small protrusions 20b. Each small protrusion 20b is located in substantially the middle of the support surface 20a in the height direction. As shown in FIG. 8, this structure reduces the likelihood that the gasket 100 slips from the groove 50. The small protrusions 20b are hemispherical, and thus their surfaces can be efficiently pressed against the side surfaces 60 of the groove 50. This more effectively reduces the likelihood that the gasket 100 slips off.

As described above, the gasket 100 according to the present embodiment includes the annular base 10 to be placed in the annular groove 50, and the protrusions 20 arranged at intervals on the base 10 in the circumferential direction of the base 10. The protrusions 20 protrude from the base 10 to face the side surfaces of the groove 50, and have the support surfaces 20a with curvatures corresponding to the curvatures of the side surfaces 60 of the groove 50. The length L1 of the protrusions 20 in the circumferential direction is greater than the interval L2 between the facing ends of protrusions 20 adjacent in the circumferential direction.

In the gasket 100 placed in the groove 50, the portion in contact with the side surfaces 60 with the protrusions 20 has a greater length than the portion that is not in contact with the side surfaces 60 in the circumferential direction. The gasket 100 fills a larger space in the groove 50 and improves sealing performance. The support surfaces 20a having substantially the entire surfaces in contact with the side surfaces 60 generate a greater frictional force between the support surfaces 20a and the side surfaces 60. This reduces the likelihood that the gasket 100 slips from the groove 50.

Each support surface 20a has round ends in the circumferential direction, or each support surface 20a has round ends in the height direction of the base 10. Thus, when the gasket 100 is placed in the groove 50 and sealed, the spaces left between the round portions and the side surfaces 60 allow the protrusions 20 to deform sufficiently and achieve stable sealing.

The base 10 and the protrusions 20 are formed from a rubber material having a rubber hardness of HDA 60 or less. This reduces the reaction force on the housing 200.

The side surfaces 60 of the groove 50 are formed from a resin material. This reduces the reaction force on the side surfaces 60 of the groove 50 formed from a resin material.

REFERENCE SIGNS LIST 10 base
11 inner circumferential surface
12 outer circumferential surface
13 lower surface
14 upper surface
20 protrusion
20a support surface
20b small protrusion
21 inner circumferential protrusion
21a inner circumferential support surface
22 outer circumferential protrusion
22a outer circumferential support surface
50 groove
60 side surface
61 inner side surface
62 outer side surface
70 bottom surface
100 gasket
200 housing
300 sealing member
C1, C2 curvature
L1 length
L2 interval

What is claimed is:

1. A gasket to be placed in a groove that is annular, the gasket comprising:
an annular base to be placed in the groove; and
a plurality of protrusions arranged at intervals on the annular base in a circumferential direction of the annular base, the plurality of protrusions protruding from the annular base to face side surfaces of the groove and having support surfaces with curvatures corresponding to curvatures of the side surfaces of the groove,
wherein the plurality of protrusions includes:
a plurality of inner circumferential protrusions located on an inner circumferential surface of the annular base, and
a plurality of outer circumferential protrusions located on an outer circumferential surface of the annular base, and
each protrusion has a length in the circumferential direction greater than an interval between facing ends of adjacent ones of the plurality of protrusions in the circumferential direction.

2. The gasket according to claim 1, wherein
the support surfaces have two round ends in the circumferential direction.

3. The gasket according to claim 1, wherein the support surfaces have two round ends in a height direction of the annular base.

4. The gasket according to claim 1, wherein the annular base and the plurality of protrusions are made of rubber material having a rubber hardness of 60 Shore A or less.

5. The gasket according to claim 1, wherein the side surfaces of the groove are made of resin material.

6. The gasket according to claim 2, wherein the support surfaces have two round ends in a height direction of the annular base.

7. The gasket according to claim 2, wherein the annular base and the plurality of protrusions are made of rubber material having a rubber hardness of 60 Shore A or less.

8. The gasket according to claim 3, wherein the annular base and the plurality of protrusions are made of rubber material having a rubber hardness of 60 Shore A or less.

9. The gasket according to claim 2, wherein the side surfaces of the groove are made of resin material.

10. The gasket according to claim 3, wherein the side surfaces of the groove are made of resin material.

11. The gasket according to claim 4, wherein the side surfaces of the groove are made of resin material.

12. A gasket for an annular groove, the gasket comprising:
an annular base configured to be placed in the annular groove;
a plurality of outer protrusions arranged at intervals on the annular base in a circumferential direction of the annular base, the plurality of outer protrusions protruding radially outward from an outer circumferential surface of the annular base to face an opposing outer side surface of the annular groove and having support surfaces with curvatures corresponding to a curvature of the outer side surface of the annular groove;
a plurality of inner protrusions arranged at intervals on the annular base in the circumferential direction of the annular base, the plurality of inner protrusions protruding radially inward from an inner circumferential surface of the annular base to face an opposing inner side surface of the annular groove and having support surfaces with curvatures corresponding to a curvature of the inner side surface of the annular groove;
wherein each of the plurality of outer protrusions has a length in the circumferential direction greater than the interval between facing ends of adjacent ones of the plurality of outer protrusions in the circumferential direction; and
wherein each of the plurality of inner protrusions has a length in the circumferential direction greater than the interval between facing ends of adjacent ones of the plurality of inner protrusions in the circumferential direction.

13. The gasket according to claim 12, wherein each of the support surfaces of the plurality of outer protrusions has two round ends in the circumferential direction, and wherein each of the support surfaces of the plurality of inner protrusions has two round ends in the circumferential direction.

14. The gasket according to claim 12, wherein each of the support surfaces of the plurality of outer protrusions has two round ends in a height direction of the annular base, and wherein each of the support surfaces of the plurality of inner protrusions has two round ends in a height direction of the annular base.

15. The gasket according to claim 12, wherein the annular base, the plurality of outer protrusions and the plurality of inner protrusions are made of rubber material having a rubber hardness of 60 Shore A or less.

16. The gasket according to claim 12, wherein the opposing inner side surface and the opposing outer sider surface of the annular groove are made of resin material.

17. The gasket according to claim 13, wherein each of the support surfaces of the plurality of outer protrusions has two round ends in a height direction of the annular base, and wherein each of the support surfaces of the plurality of inner protrusions has two round ends in a height direction of the annular base.

18. The gasket according to claim 13, wherein the annular base, the plurality of outer protrusions and the plurality of inner protrusions are made of rubber material having a rubber hardness of 60 Shore A or less.

19. The gasket according to claim 13, wherein the opposing inner side surface and the opposing outer sider surface of the annular groove are made of resin material.

20. The gasket according to claim 14, wherein the opposing inner side surface and the opposing outer sider surface of the annular groove are made of resin material.

* * * * *